United States Patent Office 3,793,312
Patented Feb. 19, 1974

3,793,312
1,2-DICYANO-3,5-DITHIO-4-SULFONYLIMIDO CYCLOPENTENES
Teruhisa Noguchi, Fujisawa, Yasushi Ysauda and Sho Hashimoto, Hiratsuka, and Saburo Kano, Odawara, Japan, assignors to Nippon Soda Co., Ltd., Tokyo, Japan
No Drawing. Filed Mar. 22, 1971, Ser. No. 126,896
Int. Cl. C07d 71/00
U.S. Cl. 260—239.6                 13 Claims

ABSTRACT OF THE DISCLOSURE

The compounds having the following formula:

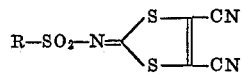

wherein R is lower alkyl having six or less carbon atoms, or aryl having less than ten carbon atoms unsubstituted or substituted by one to three substituents selected from a group consisting of lower alkyl having six or less carbon atoms, lower alkoxy having six or less carbon atoms, acylamido having six or less carbon atoms, and halogen; are prepared in accordance with the following equation:

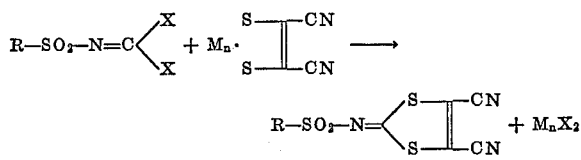

wherein X is halogen, M is alkali or alkaline earth metal and $n$ is an integer of 1 or 2; and the novel compounds have broad fungicidal and bactericide activity and very low mammalian toxicity.

---

This invention relates to novel compounds of 1,2-dicyano-4-sulfonylimido cyclopentenes and a process for the preparation of the same. Further, the invention relates to fungicidal and bactericidal compositions containing one or more of said novel compounds and further includes methods for combating fungi and bacteria with the same compounds.

In recent years, agricultural chemicals have developed remarkably, and a number of fungicides and bactericides have been discovered. Thus, a number of diseases, which have been hitherto regarded as uncontrollable, have gradually been decreased. Some diseases, however, remain and give serious damage to plants year by year because there is nothing of a suitable fungicide or bactericide especially to resistant strains for existing fungicides and bactericides or the pertinent application of effective fungicides and bactericides are obstructed by phytotoxicity or acute or chronic mammalian toxicity thereof, so that research and development of prominently effective fungicide and bactericide not having the above mentioned toxicities and not causing any pollution.

The inventors have discovered that the novel compounds of this invention have a surprising protective effect for plants from phytopathogenes and do not produce pollution or injury on or into plants and their fruits and seeds.

The novel compounds in the present invention are characterized by the following formula:

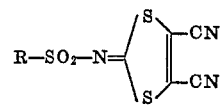

wherein R is lower alkyl having six or less carbon atoms, or aryl having less than ten carbon atoms unsubstituted or substituted by one to three substituents selected from a group consisting of lower alkyl having six or less carbon atoms, lower alkoxy having six or less carbon atoms, acylamino having six or less carbon atoms, and halogen.

The compounds of this invention have superial activity and a number of fungi and bacteria are affected growth-inhibitorily, fungi- and bactericidally and/or curatively by them. Species of fungi and bacteria mostly affected by the compounds of this invention are as follows: Alternaria spp., Phythophthora spp., Helminthosporium spp., Colletotrichum spp., Pseudoperonospora spp.

Further, bactericidal and fungicidal activity of these compounds may be expected against Botrytis sp., Cercospora sp., Elsinoe sp. Glomerella sp., Mycosphaerella sp., Pellicularia sp., Penicillium sp., Phaeoisariopsis sp., Piricularia sp., Podosphaera sp., etc.

It is an advantage of the invention that the compounds of this invention have very low mammalian toxicity. For example, acute oral toxicity LD–50 for mouse of 1,2-dicyano - 3,5 - dithio-4-(4-chlorobenzene sulfonylimido)-cyclopentene (Compound III) and 1,2-dicyano-3,5-dithio-4-(4-tosylimide)cyclopentene (Compound V) are more than 1500 mg./kg. respectively.

The compounds of this invention can be prepared by the equation illustrated as follows

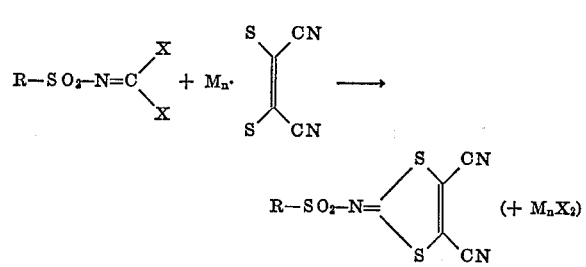

wherein R, X, M and $n$ are same as defined above:

The reactions can be carried out in an inert organic solvent such as benzene, toluene, dichloroethane, chloroform, carbon tetrachloride, acetone, methylethylketone, ethyl acetate, methyl acetate, diethylether, tetrahydrofuran, dioxan, acetonitril, dimethylsulfoxide, dimethylformamide etc., at a temperature of 0° C. to the boiling point of the solvent employed, preferably 0 to 50° C., for an adequate time according to the other reaction conditions e.g. about thirty minutes to about five hours or more. At the end of the reaction, an objective product is isolated from the reaction mixture by conventional techniques. For example, the reaction mixture may be cooled or water may be added thereto. Then precipitated material is separated from the solution by filtration, decantation or extraction. Instead of the above, the solvent may be distilled off from the reaction mixture under reduced pressure.

The separated compound may be further washed with water, if necessary, and purified by recrystallizing from a solvent such as acetone, ethanol, acetonitrile, dimethyl formamide and the mixture thereof.

In order to facilitate a clear understanding of the invention, the following preferred specific embodiments are described as illustrative and not as limiting the invention.

EXAMPLE 1

Preparation of 4,5-dicyano-1,3-dithio-2-methanesulfonylimidocyclopentene (Compound I)

41 g. (0.22 mole) of disodium salt of 1,2-dicyano-1,2-dimercaptoethene was added to 35.2 g. (0.2 mole) of methanesulfonylimidodichloride in 150 ml. of acetonitrile at a temperature of 0 to 5° C., and the reaction mixture was kept below 10° C. for 1 hour under agitation. Then, about 500 ml. of water was gradually added to the reaction mixture, the precipitated crystals were collected by filtration and washed with water, the dried crystals were recrystallized from the mixed solvent of ethanol and acetone (1:1), and 34 g. of brown crystal of 4,5-dicyano-1,3-dithio - 2 - methane - sulfonylimidocyclopentene having a melting point of 175–176° C. was obtained.

Elemental analysis was as follows: Found (percent): C, 29.62; H, 1.34; N, 16.91. Calcd. for $C_6H_3N_3O_2S_3$ (percent): C, 29.38; H, 1.23; N, 17.13.

EXAMPLE 2

Preparation of 4,5-dicyano-1,3-dithio-2-benzenesulfonylimidocyclo pentene (Compound II)

By a procedure similar to that of Example 1, 78 g. (0.42 mole) of disodium salt of 1,2-dicyano-1,2-dimercaptoethene and 90 g. (0.38 mole) of benzene-sulfonylimidodichloride in 300 ml. of acetonitrile were kept below 10° C. for 1 hour under agitation. Then, about 1:1. of water was gradually added to the reaction mixture, the precipitated crystals were collected by filtration and washed with water. The dried crystals were recrystallized from the mixed solvent of acetone and ethanol (1:1), and 43 g. of yellow crystal of 4,5-dicyano-1,3-dithio-2-benzenesulfonylimidocyclo pentene having a melting point of 149–151° C. was obtained.

Elemental analysis was as follows: Found (percent): C, 43.11; H, 1.70; N, 13.49. Calcd. for $C_{11}H_5N_3O_2S_3$ (percent): C, 42.98; H, 1.64; N, 13.64.

EXAMPLE 3

Preparation of 4,5-dicyano-1,3-dithio-2-(4-chlorobenzenesulfonylimido)cyclopentene (Compound III)

22.5 g. (0.121 mole) of disodium salt of 1,2-dicyano-1,2-dimercaptoethene was added to 30 g. (0.11 mole) of 4-chlorobenzenesulfonylimidodichloride in 135 ml. of acetonitrile at a temperature of 0 to 5° C. and the reaction mixture was kept for 1 hour at the same temperature under agitation. Then the mixture was cooled, the deposited crystals were collected by filtration and washed the crystals with water. The dried crystals were recrystallized from acetonitrile, and 24.4 g. of brown crystals of 4,5-dicyano-1,3-dithio-2-(4-chloro - sulfonylimido)cyclopentene having a melting point of 171.5–173.5° C. were obtained.

Elemental analysis was as follows: Found (percent): C, 38.55; H, 1.20; N, 12.18. Calcd. for $C_{11}H_4ClN_3O_2S_3$ (percent): C, 38.65; H, 1.18; N, 12.29.

EXAMPLE 4

Preparation of 4,5-dicyano-1,3-dithio-2-(4-tosylimido) cyclopentene (Compound V)

By a procedure similar to that of Example 1, 4.1 g. (0.022 mole) of dissodium salt of 1,2-dicyano-1,2-dimercaptoethene and 5.02 g. (0.02 mole) of 4-tosylimidodichloride in 30 ml. of acetonitrile were kept below 10° C. for 1 hour under agitation. Then, about 100 ml. of water was gradually added to the reaction mixture, the precipitated crystals were collected by filtration and washed with water. The dried crystals were recrystallized from the mixed solvent of acetone and ethanol (1:1), and 3.4 g. of brown crystal of 4,5-dicyano-1,3-dithio-2-(p-tosylimido)-cyclopentene having a melting point of 160–161° C. was obtained.

Elemental analysis was as follows: Found (percent): C, 44.97; H, 2.16; N, 12.88. Calcd. for $C_{12}H_7N_3O_2S_3$ (percent); C, 44.84; H, 2.20; N, 13.07.

EXAMPLE 5

Preparation of 4,5-dicyano-1,3-dithio-2(2,4-dimethylsulfonylimido)cyclopentene (Compound X)

By a procedure similar to that of Example 1, 82 g. (0.44 mole) of dissodium salt of 1,2-dicyano-1,2-dimercaptoethene and 100.6 g. (0.4 mole) of 2,4-dimethyl-benzenesulfonylimidodichloride in 300 ml. of acetonitrile were kept below 10° C. for 1 hour under agitation. Then about 1:1. of water was gradually added to the reaction mixture, the precipitated crystals were collected by filtration and washed with water. The dried crystals were recrystallized from acetone, and 79.5 of white crystal of 4,5-dicyano-1,3-dithio-2 - (2,4 - dimethylbenzenesulfonylimido)cyclopentene having a melting point of 170–171° C. was obtained.

Elemental analysis was as follows: Found (percent): C, 46.36; H, 2.64; N, 12.88. Calcd. for $C_{13}H_9N_3O_2S_3$ (percent): C, 46.55; H, 2.71; N, 12.53.

EXAMPLE 6

Preparation of 4,5-dicyano-1,3-dithio-2-(1-naphthalenesulfonylimido)cyclopentene (Compound XII)

By a procedure similar to that of Example 1, 41 g. (0.22 mole) of disodium salt of 1,2-dicyano-1,2-dimercaptoethene and 59.4 g. (0.2 mole) of 1-naphthalenesulfonylimidodichloride in 150 ml. of acetonitrile were kept below 10° C. for 1 hour under agitation. Then about 500 ml. of water was gradually added to the reaction mixture, the precipitated crystals were collected by filtration and washed with water. The dried crystals were recrystallized from dimethylformamide, and 48.6 g. of yellow crystal of 4,5-dicyano-1,3-dithio-2-(1-naphthalenesulfonylimido) cyclopentene having a melting point 235–237° C. with decomposition was obtained.

Elemental analysis was as follows: Found (percent): C, 50.31; H, 1.81; N, 12.15. Calcd. for $C_{15}H_7N_3O_2S_3$ (percent): C, 50.40; H, 1.97; N, 11.92.

Some typical compounds of the invention are listed in Table 1, along with some of their properties.

These typical compounds in Table 1 include merely some of the compounds of the present invention, so that the scope of the present invention is not intended to be limited only to those compounds listed in Table 1.

| No. of compound | Structural formula | Chemical name | Melting point (° C.) |
|---|---|---|---|
| I | CH₃—SO₂—N=C(S-C(CN)=C(CN)-S) | 1,2-dicyano-3,5-dithio-4-methanesulfonylimido cyclopentene | 175–176 |
| II | C₆H₅—SO₂—N=C(S-C(CN)=C(CN)-S) | 1,2-dicyano-3,5-dithio-4-benzenesulfonylimido cyclopentene | 149–151 |
| III | Cl—C₆H₄—SO₂—N=C(S-C(CN)=C(CN)-S) | 1,2-dicyano-3,5-dithio-4-(4-chlorobenzenesulfonylimido) cyclopentene. | 171.5–173.5 |
| IV | 2-CH₃-C₆H₄—SO₂—N=C(S-C(CN)=C(CN)-S) | 1,2-dicyano-3,5-dithio-4-(2-tosylimido) cyclopentene | 165–167 |
| V | 4-CH₃-C₆H₄—SO₂—N=C(S-C(CN)=C(CN)-S) | 1,2-dicyano-3,5-dithio-4-(4-tosylimido) cyclopentene | 160–161 |
| VI | C₂H₅—C₆H₄—SO₂—N=C(S-C(CN)=C(CN)-S) | 1,2-dicyano-3,5-dithio-4-(4-ethylbenzenesulfonylimido)cyclopentene. | 157.5–160 |
| VII | CH₃O—C₆H₄—SO₂—N=C(S-C(CN)=C(CN)-S) | 1,2-dicyano-3,5-dithio-4-(4-methoxybenzenesulfonylimido) cyclopentene. | 140–142 |
| VIII | CH₃—C(O)—NH—C₆H₄—SO₂—N=C(S-C(CN)=C(CN)-S) | 1,2-dicyano-3,5-dithio-4-(4-acetamidobenzenesulfonylimido) cyclopentene. | 210–212 |
| IX | 2,5-Cl₂-C₆H₃—SO₂—N=C(S-C(CN)=C(CN)-S) | 1,2-dicyano-3,5-dithio-4-(2,5-dichlorobenzenesulfonylimido) cyclopentene. | 212–214 |
| X | 2,4-(CH₃)₂-C₆H₃—SO₂—N=C(S-C(CN)=C(CN)-S) | 1,2-dicyano-3,5-dithio-4-(2,4-dimethylbenzenesulfonylimido) cyclopentene. | 170–171 |
| XI | 2,5-(CH₃)₂-C₆H₃—SO₂—N=C(S-C(CN)=C(CN)-S) | 1,2-dicyano-3,5-dithio-4-(2,5-dimethylbenzenesulfonylimido) cyclopentene. | 145–150 |
| XII | 1-naphthyl—SO₂—N=C(S-C(CN)=C(CN)-S) | 1,2-dicyano-3,5-dithio-4-(1-naphthalenesulfonylimido)cyclopentene. | [1] 235–237 |

[1] Decomposition.

The compounds listed in Table 1 possess very superior fungi- and bactericidal activity compared to known compounds.

In this invention usually a small but effective amount of the compound is applied to plant surface by spraying, or dusting to protect or control fungi and bacteria and diseases suffered therefrom. The concentrations of the active ingredients in the fungicidal or bactericidal composition of this invention vary according to type of formulation, and they are, for example, used in a range of 5–80 weight percent, preferably 10–70 weight percent, in emulsifiable concentrates and 0.5–20 weight percent, preferably 1–10 weight percent in dust formulations.

In the above formulation of the composition, auxiliary agents or materials, for example, inert mineral powders such as clay, talc and diatomaceous earth, dispersing agents such as sodium lignin sulfonate and casein, and wetting agents such as alkylarylsulfonate and polyoxyethylene alkylphenol, may be employed according to the type of the formulation for combatting fungi and bacteria. Furthermore, the composition may be applied as a mixture with other fungicides, bactericides, insecticides, acaricides, plant growth regulators and fertilizers.

The non-limiting examples for the fungicidal or bactericidal compositions are illustrated as follows:

EXAMPLE 7

Wettable powder

| | Parts by weight |
|---|---|
| Compound 2 | 20 |
| Sodium alkylsulfonate | 5 |
| Diatomaceous earth | 75 |

These were mixed and micronized in jet pulverizer to a particle size of 10–30 microns. In practical use, the micronized mixture was diluted to a concentration of 0.05 to 0.1% of active ingredient with water. The suspension is applied as spray.

EXAMPLE 8

Emulsifiable concentrate

| | Parts by weight |
|---|---|
| Compound 3 | 10 |
| Polyoxyethylene phenylether | 5 |
| Cyclohexanone | 20 |
| Xylene | 65 |

These were mixed and dissolved. In practical use, the solution is diluted with water to a concentration of 0.01 to 0.05% of active ingredient and this suspension is sprayed or used for drenching.

EXAMPLE 9

Dust formulation

| | Parts by weight |
|---|---|
| Compound 5 | 3 |
| Talc | 97 |

These were mixed and crushed to fine powder. The dust formulation is usually applied as dusting powder at a rate of 3 to 5 kg. per acre.

EXAMPLE 10

Mixed wettable powder

| | Parts by weight |
|---|---|
| Compound 1 | 15 |
| Compound 4 | 15 |
| Sodium alkylsulfonate | 5 |
| Diatomaceous earth | 65 |

These were mixed, micronized and applied following the procedure of Example 7.

In the Examples 7–10, it is not intended to limit the emulsifying, wetting or dispersing agents, carriers and solvents to the ones described by way of illustration.

The superior fungicidal and bactericidal effects of the novel compounds of this invention are clearly illustrated by the following tests.

TEST 1

Test for control of Phytopathogenes by filter paper disc method

Filter paper disc having 8 mm. diameter was prepared to contain 0.016 mg. of active ingredient. The disc was placed on the surface of potato dextrose-agar medium poured and coagulated in a disc dish of 11 mm. diameter and uniformly inoculated with suspension of a phytopathogen. The disc dish was placed on a shelf of incubator and kept at a temperature of 28° C. The diameters of inhibitory zone after 2 days for bacteria and after 6 days for fungi are shown in Table 2.

| | Aternaria mali | Cladosporium fulvum | Colletotrichum lagenarium | Piricularia oryzae | Xanthomonas citri | Xanthomonas oryzae |
|---|---|---|---|---|---|---|
| Compound No.: | | | | | | |
| I | 40 | 40 | 45 | 40 | 10 | 35 |
| III | 20 | 22 | 16 | 25 | — | 20 |
| V | 20 | 20 | 25 | 30 | — | 22 |
| Control | 10 | + | 20 | 20 | 15 | 12 |

NOTE.—Control is tetrachloroisophthalonitril. +=Existing a hindered circle under the paper disc; —=Not existing any inhibitory zone.

TEST 2

Test for control of Alternaria leaf spot

The potted young apple plants (King Star) were sprayed, at a rate of 200 ml. per plant, with water-dilute suspension having an active ingredient at a concentration of 500 p.p.m. which suspension was prepared by dilution of wettable powder formulated by the method of Example 7. Young branches having about 15 leaves were cut off from each tree at each time, that is, just after naturally dried and 3 days, 6 days and 9 days after the spraying of above suspension, and then inoculated spraying with spore suspension of *Alternaria mali*, and held under the condition of incubation (at about 100% relative humidity and at a temperature of 28° C.) for 24 hours in a wet chamber. Then, average number of lesions per branch was counted and evaluation of percent disease control was computed on the basis of number of lesions occurring on the untreated check.

TABLE 3

| | Time between spraying and inoculation (days) | Average No. of lesions per leaf | Control value (percent) | Phytotoxicity |
|---|---|---|---|---|
| Compound No. II | ¹0 | 0 | 100 | None. |
| | 3 | 0 | 100 | Do. |
| | 6 | 0 | 100 | Do. |
| | 9 | 1.0 | 99.5 | Do. |
| Control ² | ¹0 | 4.2 | 93.3 | Do. |
| | 3 | 4.4 | 96.0 | Do. |
| | 6 | 6.8 | 96.0 | Do. |
| | 9 | 16.0 | 94.0 | Do. |
| Check | ¹0 | 63 | 0 | |
| | 3 | 109 | 0 | |
| | 6 | 171 | 0 | |
| | 9 | 208 | 0 | |

¹ Inoculation is made just after suspension of wettable powder sprayed on branch has been dried naturally.
² N-(1,1,2,2-tetrachloroethylthio)-4-chlorohexene-1,2-dicarboxyimide.

TABLE 4

| | Time between spraying and inoculation (days) | Average No. of lesions per leaf | Control value (percent) | Phytotoxicity |
|---|---|---|---|---|
| Compound No. XII. | 1 0 | 0 | 100 | None. |
| | 3 | 0 | 100 | Do. |
| | 6 | 0 | 100 | Do. |
| | 9 | 0 | 100 | Do. |
| Control 2,3 | 1 0 | 7.3 | 90.3 | Do. |
| | 3 | 12.4 | 90.2 | Do. |
| | 6 | 21.0 | 89.9 | Do. |
| | 9 | 29.0 | 87.1 | Do. |
| | 1 0 | 75 | 0 | |
| | 3 | 127 | 0 | |
| | 6 | 208 | 0 | |
| | 9 | 225 | 0 | |

1 Same as footnote 1 in Table 3.
2 Zinc N,N-dimethyldithiocarbamate (A) plus bis(dimethyldithiocarbomoyl)ethylenediamine (B).
3 Concentrations of active ingredients are 500 p.p.m. (A) plus 300 p.p.m. (B).

TABLE 5

| | Time between spraying and inoculation (days) | Average No. of lesions per leaf | Control value (percent) | Phytotoxicity |
|---|---|---|---|---|
| Compound No.: | | | | |
| VII | 1 0 | 0 | 100 | None. |
| | 3 | 0 | 100 | Do. |
| | 6 | 0 | 100 | Do. |
| | 9 | 8.8 | 96.5 | Do. |
| IX | 1 0 | 0 | 100 | Do. |
| | 3 | 0 | 100 | Do. |
| | 6 | 0 | 100 | Do. |
| | 9 | 0 | 100 | Do. |
| X | 1 0 | 0 | 100 | Do. |
| | 3 | 0 | 100 | Do. |
| | 6 | 1.1 | 99.5 | Do. |
| | 9 | 3.2 | 98.5 | Do. |
| XI | 1 0 | 0 | 100 | Do. |
| | 3 | 0 | 100 | Do. |
| | 6 | 0 | 100 | Do. |
| | 9 | 0 | 100 | Do. |
| XIII | 1 0 | 0 | 100 | Do. |
| | 3 | 0 | 100 | Do. |
| | 6 | 6.2 | 96.9 | Do. |
| | 9 | 10.7 | 95.7 | Do. |
| Control 2 | 1 0 | 4.1 | 94.8 | Do. |
| | 3 | 4.7 | 96.6 | Do. |
| | 6 | 7.1 | 96.5 | Do. |
| | 9 | 12.7 | 94.9 | Do. |
| Check | 1 0 | 79 | 0 | |
| | 3 | 138 | 0 | |
| | 6 | 201 | 0 | |
| | 9 | 249 | 0 | |

1 Same as footnote 1 in Table 3.
2 Polyoxin, antibiotics agricultural fungi- and bactericide sold in the market.

TEST 3

Test for control of rice blast disease

Three of pot in which 24 rice plants (Chukyo-Asahi) are grown to three leaves stage were used as one test unit. The potted rice plants were inoculated with spore suspension of rice blast fungus, Piricularia oryzae by spraying, and held under the incubation condition (at about 100% relative humidity and 26° C.) for 24 hours in a wet cabinet. Then the pots were moved to a greenhouse bench. One day later, the plants were sprayed, at a rate of 50 ml. per test unit, with water-dilute suspension of wettable powder prepared according to the method of Example 7. Six and ten days after inoculation, number of lesions per test unit was counted and evaluation of percent disease control was computed on the basis of number of lesions occurring on the untreated check.

The results are shown in Table 6.

TEST 4

Test for control of rice Helminthosporium leaf spot

Seven of pot in which 24 rice plants (Chukyo-Asahi) were grown to three leaves stage were used as one test unit. The rice plants were sprayed, at a rate of 100 ml. per unit, with water-dilute suspension of wettable powder prepared according to the method of Example 7. One day later, the plants were inoculated with spore suspension of Cochliobolus myabeanus by spraying, and held under the incubation condition of about 100% relative humidity and 26° C. for 24 hours in a wet chamber. Three days after the inoculation, the number of lesions per test unit was counted and the average number of lesions per ten leaves was calculated, and further evaluation of percent disease control on the basis of the number of lesions occurring on the untreated check.

The results are shown in Tables 7 to 10.

TABLE 6

| | Conc. of active ingredient (p.p.m.) | Average No. of lesions per leaf | | Control value (percent) | | Phytotoxicity |
|---|---|---|---|---|---|---|
| | | 6 days | 10 days | 6 days | 10 days | |
| Compound No.: | | | | | | |
| 5 | 500 | 0 | 1.0 | 100 | 99.8 | None. |
| | 250 | 0 | 4.1 | 100 | 99.3 | Do. |
| | 100 | 1.0 | 10.5 | 99.7 | 98.1 | Do. |
| 6 | 500 | 0 | 0 | 100 | 100 | Do. |
| | 250 | 0 | 0.3 | 100 | 99.9 | Do. |
| | 100 | 0 | 0.3 | 100 | 99.8 | Do. |
| 7 | 500 | 0 | 0 | 100 | 100 | Do. |
| | 250 | 0 | 3.3 | 100 | 99.4 | Do. |
| | 100 | 7.4 | 12.7 | 97.8 | 97.7 | Do. |
| 9 | 500 | 0 | 0 | 100 | 100 | Do. |
| | 250 | 0 | 0.7 | 100 | 99.9 | Do. |
| | 100 | 0 | 2.8 | 100 | 99.5 | Do. |
| 10 | 500 | 0 | 0 | 100 | 100 | Do. |
| | 250 | 5.6 | 10.1 | 98.4 | 98.4 | Do. |
| | 100 | 14.5 | 21.4 | 95.7 | 95.7 | Do. |
| Control 1 | 500 | 31.1 | 40.2 | 90.8 | 92.8 | Slight.2 |
| Check | | 340.0 | 561.5 | 0 | 0 | |

1 Kitazin-P, fungicide sold in market in which S-benzyl-O,O-di-isopropyl phospate is contained as active ingredient.
2 Nibs of some leaves were withered.

TABLE 7

| | Conc. of active ingredient (p.p.m.) | Average No. of lesions per ten leaves | Control value (percent) | Phytotoxicity |
|---|---|---|---|---|
| Compound No. II | 500 | 2.8 | 99.0 | None. |
| | 300 | 3.0 | 98.9 | Do. |
| | 100 | 5.8 | 97.9 | Do. |
| Control 1 | 500 | 13.0 | 95.3 | Do. |
| | 300 | 18.2 | 94.5 | Do. |
| | 100 | 34.8 | 87.7 | Do. |
| Check | | 282.0 | 0 | |

1 Control is 1,2-dicyano-3,5-dithio-4-phenylcyclopentene.

TABLE 8

| | Conc. of active ingredient (p.p.m.) | Average No. of lesions per ten leaves | Control value (percent) | Phytotoxicity |
|---|---|---|---|---|
| Compound No. IV | 500 | 2.7 | 99.0 | None. |
| | 300 | 3.0 | 98.9 | Do. |
| | 100 | 6.4 | 97.7 | Do. |
| Control 1 | 500 | 13.0 | 95.4 | Do. |
| | 300 | 18.2 | 93.5 | Do. |
| | 100 | 34.8 | 87.7 | Do. |
| Check | | 282.0 | 0 | |

1 Control is same as Table 7.

TABLE 9

| | Conc. of active ingredient (p.p.m.) | Average No. of lesions per ten leaves | Control value (percent) | Phytotoxicity |
|---|---|---|---|---|
| Compound No. V | 500 | 1.8 | 99.4 | None. |
| | 300 | 3.0 | 99.0 | Do. |
| | 100 | 6.5 | 97.8 | Do. |
| Control 1 | 500 | 13.3 | 95.6 | Do. |
| | 300 | 18.4 | 93.9 | Do. |
| | 100 | 33.9 | 88.7 | Do. |
| Check | | 300.6 | 0 | |

TABLE 10

| Compound No.: | Conc. of active ingredient (p.p.m.) | Average No. of lesions per ten leaves | Control value (percent) | Phyto-toxicity |
|---|---|---|---|---|
| I | 500 | 6.7 | 98 | None. |
|  | 300 | 4.4 | 98.7 | Do. |
|  | 100 | 87.0 | 88.9 | Do. |
| III | 500 | 5.7 | 98.3 | Do. |
|  | 300 | 8.0 | 99.1 | Do. |
|  | 100 | 8.0 | 97.6 | Do. |
| V | 500 | 4.0 | 98.8 | Do. |
|  | 300 | 3.0 | 99.1 | Do. |
|  | 100 | 8.0 | 97.6 | Do. |
| Control A [1] | 500 | 1.7 | 99.5 | Do. |
|  | 300 | 8.6 | 98.9 | Do. |
|  | 100 | 67.0 | 79.5 | Do. |
| Control B [2] | 500 | 14.9 | 95.2 | Do. |
|  | 300 | 22.0 | 93.3 | Do. |
|  | 100 | 37.3 | 88.7 | Do. |
| Check |  | 330.0 | 0 |  |

[1] Control A is 2,4-dichloro-6-(2-chloroaniline)-S-triazine.
[2] Control B is same as control of Table 7.

We claim:
1. A compound represented by the formula

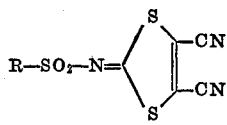

wherein R is lower alkyl having six or less carbon atoms, or aryl having less than ten carbon atoms unsubstituted or substituted by one to three substituents selected from a group consisting of lower alkyl having six or less carbon atoms, lower alkoxy having six or less carbon atoms, alkanoylamido having six or less carbon atoms, and halogen.

2. A compound according to claim 1, in which the compound has the formula of

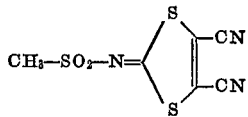

3. A compound according to claim 1, in which the compound has the formula of

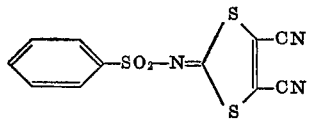

4. A compound according to claim 1, in which the compound has the formula of

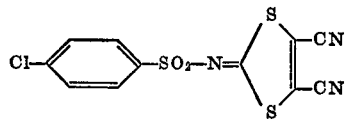

5. A compound according to claim 1, in which the compound has the formula of

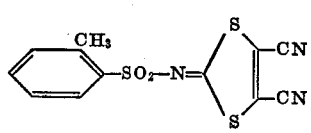

6. A compound according to claim 1, in which the compound has the formula of

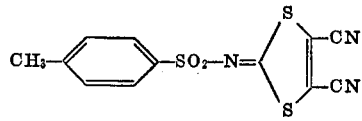

7. A compound according to claim 1, in which the compound has the formula of

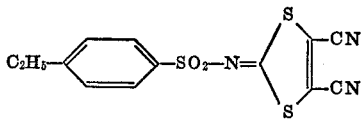

8. A compound according to claim 1, in which the compound has the formula of

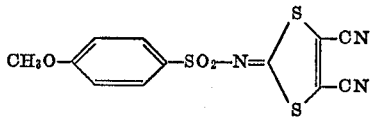

9. A compound according to claim 1, in which the compound has the formula of

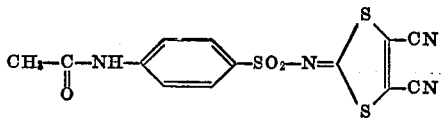

10. A compound according to claim 1, in which the compound has the formula of

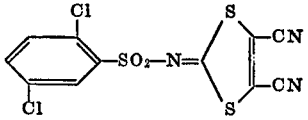

11. A compound according to claim 1, in which the compound has the formula of

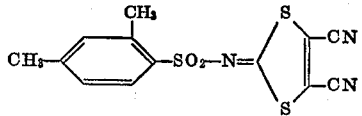

12. A compound according to claim 1, in which the compound has the formula of

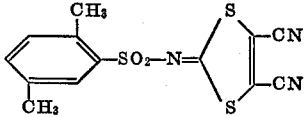

13. A compound according to claim 1, in which the compound has the formula of

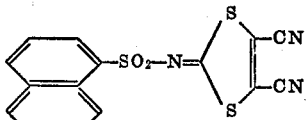

References Cited
UNITED STATES PATENTS
3,467,672   9/1969   Addor _____ 260—327

ALAN L. ROTMAN, Primary Examiner
C. M. JAISLE, Assistant Examiner

U.S. Cl. X.R.
260—327 U; 71—90